United States Patent [19]

Hutton et al.

[11] Patent Number: 4,720,311

[45] Date of Patent: Jan. 19, 1988

[54] CAMSHAFT LOBE HARDENING METHOD AND APPARATUS

[76] Inventors: Roger L. Hutton, 3141 Pinewood Ct., Milford, Mich. 48042; John P. Williams, Jr., 10475 Moon Lake Ct., Pinckney, Mich. 48169

[21] Appl. No.: 843,060

[22] Filed: Mar. 24, 1986

[51] Int. Cl.[4] ............................................. C21D 1/10
[52] U.S. Cl. ................................. 148/150; 266/127; 266/129
[58] Field of Search ................ 148/150, 154; 266/127, 266/129

[56] References Cited

U.S. PATENT DOCUMENTS 4,604,510 8/1986 Laughlin et al. ................... 148/150

Primary Examiner—R. Dean
Attorney, Agent, or Firm—Barnes, Kisselle, Raisch, Choate, Whittemore & Hulbert

[57] ABSTRACT

A method and apparatus for making camshafts of steel by hardening the lobes after they have been rough and finish machined and the final contour and finish of the cam surface formed on each lobe while the steel is soft. Each lobe with the finished cam surface thereon is disposed in an induction coil to which an alternating current is applied for not more than about five seconds to rapidly heat the peripheral portion of the lobe which is then quenched by spraying an aqueous liquid on the lobe preferably while still in the coil. This heating and quenching hardens the peripheral portion of the lobe by a martensite transformation thereof without any significant warping or distortion of the cam surface. To prevent a previously hardened lobe from being annealed by induction heating of an immediately adjacent lobe, preferably a cooling or quenching liquid is also sprayed on the camshaft between these lobes and immediately adjacent the heated lobe.

27 Claims, 6 Drawing Figures

CAMSHAFT LOBE HARDENING METHOD AND APPARATUS

FIELD OF THE INVENTION

This invention relates to metal camshafts for engines and more particularly to a method and apparatus for making them by heating and quenching the lobes of the camshaft to harden them after the contour and finish of the cam surface has been produced on the lobes prior to hardening.

BACKGROUND OF THE INVENTION

Typically, camshafts for internal combustion engines have been produced by casting or forging a blank of cast iron, steel or other metal which can be hardened by heating and quenching. After the blank has been formed, the lobes and bearing journals are rough and finish machined and then the lobes are hardened. After hardening, the lobes are ground to provide the desired contour and surface finish of the cam surface on each lobe.

The grinding of hardened lobes produces stresses detrimental to the useful life of the camshaft and sometimes produces burning and cracking of the lobes resulting in scrap and defective camshafts. Making camshafts this way has high material and labor costs, requires a large capital investment in production equipment and equipment to check every lobe of every camshaft for defects produced by grinding after hardening, and is relatively inefficient expensive and unsuited for high volume mass production.

SUMMARY OF THE INVENTION

In accordance with this invention, a camshaft of metal such as steel which can be hardened is machined and ground while the steel is soft or not hardened. While the steel is soft, the lobes are ground to provide the desired contour, dimensional accuracy and finish of the cam surface of each lobe. After the desired contour and finish of the cam surface has been produced, each lobe is hardened without any significant distortion or warping of the cam surface by rapidly induction heating the peripheral portion of the lobe and quenching it with an aqueous liquid. This heating and quenching hardens the steel adjacent the periphery of the lobe by producing a martensite transformation therein. To minimize distortion and warping of the cam surface, only the peripheral portion of the lobe is heated sufficiently to produce a martensite transformation therein when quenched which minimizes the depth of the hardened steel of the lobe.

Preferably, one lobe at a time of the cam shaft is hardened by disposing it in an induction coil encircling and spaced from the lobe to which an alternating current is applied for not more than about 5 seconds to rapidly heat the lobe which is then immediately quenched by an aqueous liquid. Preferably, the alternating current applied to the coil has a frequency of at least 3,000 Hz and a power of at least 30 killowatts (KW) per square inch of area of the cam surface of the lobe and desirably a power in the range of 35 to 60 KW per square inch of the cam surface of the lobe.

Preferably, the lobe is quenched by spraying the acqueous liquid on the lobe while it is still received in the induction coil. Preferably, to prevent a previously hardened lobe from being annealed by the induction heating of an immediately adjacent lobe, the aqueous liquid is also sprayed on the area of the cam shaft between these lobes. Preferably, to more uniformly heat and cool the lobe, it is rotated relative to the induction coil while being heated and the spray while being quenched.

Objects, features and advantages of this invention are to provide a method and apparatus for making a steel camshaft by hardening the lobes after the contour and finish of their cam surfaces are formed without any significant distortion or warping of the finished cam surfaces, which eliminates cracking, burning and stressing of the lobes when grinding their cam surfaces, greatly increases the productivity and efficiency and reduces the cost of making camshafts, substantially decreases the capital investment and equipment required to make camshafts, greatly reduces scrap and defective camshafts, and is rapid, reliable, efficient and well suited for high volume mass production manufacture.

BRIEF DESCRIPTION OF THE DRAWINGS

These and other objects, features and advantages of this invention will be apparent from the following detailed description, appended claims and accompanying drawings in which:

DETAILED DESCRIPTION

Figure 1:
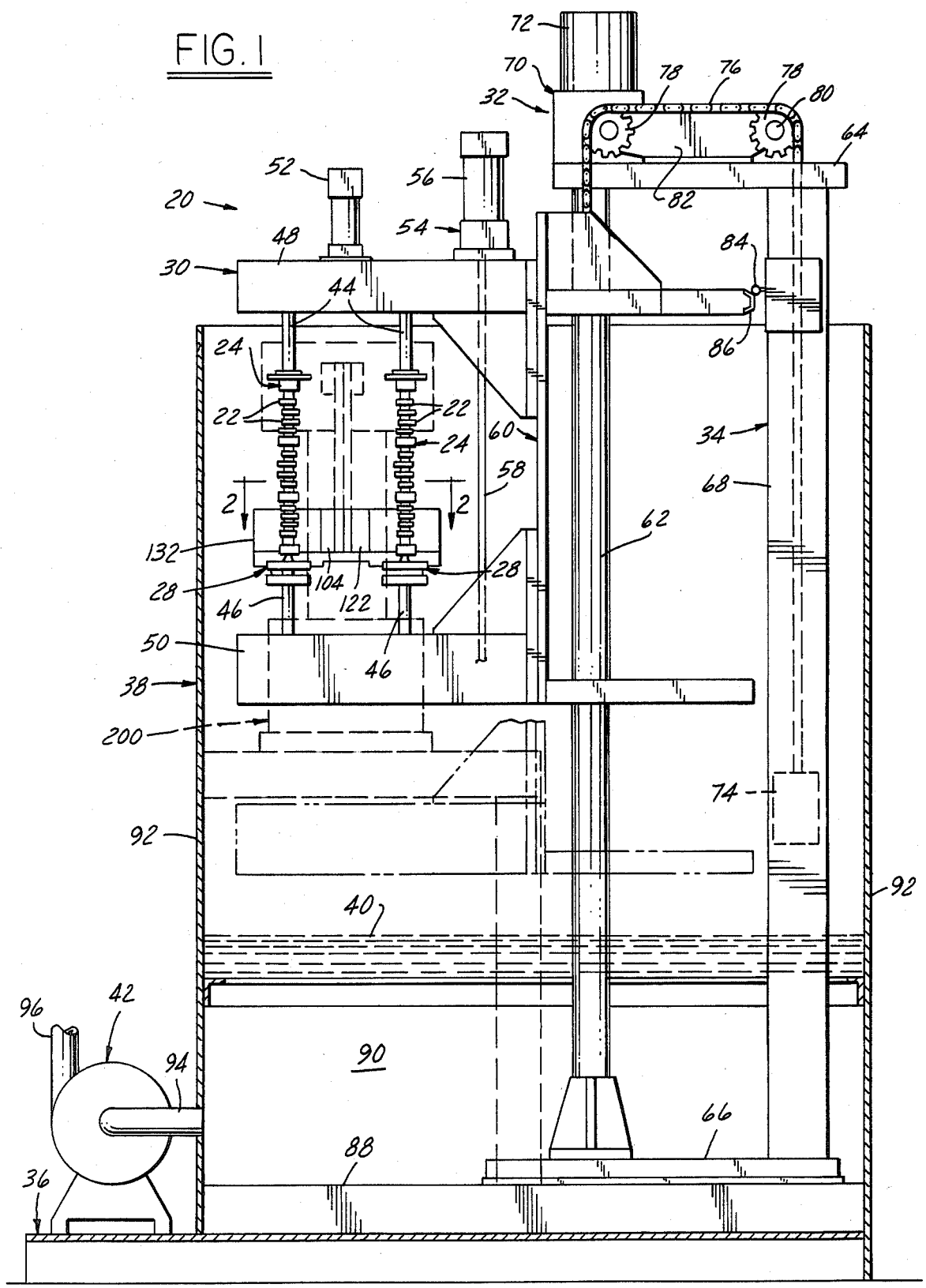
FIG. 1 is a side view partially in section of a suitable apparatus for induction heating and quenching the lobe of a camshaft in accordance with this invention.

In accordance with this invention, the contour and finish of the cam surface of each lobe of a camshaft of steel is formed and finished while the steel is soft and before it is hardened. Typically, the camshaft is made from a cast or forged blank of cast iron or steel which can be hardned by heating and quenching such as nodular cast iron or SAE 1050M, 5150 or 8620 steel. The bearing journals and lobes are rough and finish machined and the lobes are ground to the desired contour and finish of their cam surfaces while the steel is soft or unhardened.

Thereafter, the periphery of each lobe is hardened by rapidly induction heating the lobe and then quenching it with water or an aqueous based mixture with various additives inhibiting oxidation, bacterial growth, etc. With a multiple lobe camshaft, preferably one lobe at a time is heated and quenched. The peripheral portion of the lobe is hardened by a martensite transformation. To minimize distortion and warping of the cam surface only the steel adjacent the periphery of the lobe is hardened. The maximum depth of this hardness is usually not more than about 0.18 of an inch, desirably not more than about 0.15 of an inch, preferably not more than about 0.12 of an inch. Usually, the depth of this hardness is greater around the nose portion of the lobe, than it is around the base circle portion of the lobe. The minimum depth of this hardness is preferably about 0.03 of an inch. The average depth of this hardness around the entire periphery of the lobe in usually in the range of about 0.03 to 0.12 of an inch, desirably 0.35 to 0.10 of an inch, and preferably about 0.04 to 0.08 of an inch. After hardening, a lobe of SAE 5150 steel usually has a Rockwell hardness at a depth of penetration of 0.03 of an inch of about $R_c$ 58–60.

This desired hardness without significant distortion or warping is achieved by applying an alternating current or current to the induction coil for not more than about 5 seconds with a power of at least 30 KW per square inch of area of the cam surface of the lobe. The power of this current in killowatts per square inch of the cam surface is usually about 35 to 60, desirably 40 to 50 and preferably about 40 to 45. As the power per square inch of the current increases the period of time the power is applied to the coil can be decreased. Frequently, the current is applied to the coil for less than 4 seconds and often in the range of about 1 to 3 seconds. The cam surface of the lobe is usually heated to a temperature of at least about 1500° F., usually at least about 1550° F., and preferably in the range of about 1550° to 1700° F.

The martensite transformation in the lobe occurs when it is quenched in an aqueous liquid. Preferably a lobe of steel is quenched substantially immediately upon completion of applying the current to the induction coil. Preferably, a lobe of cast iron is quenched at least about 2 seconds after completion of applying the current to the induction coil to insure the carbon is in solution before quenching. Preferably, this is accomplished by spraying the aqueous liquid on the lobe while still received in the induction coil. To increase the cooling rate and uniformity of the quench, preferably the liquid is sprayed under pressure onto the lobe from multiple nozzles of a spray head encircling the lobe. To prevent a previously hardened lobe from being annealed by the induction heating of an immediately adjacent lobe, preferably the liquid is also sprayed under pressure onto the portion of the camshaft between the lobes and immediately adjacent the heated lobe. To provide more uniform heating, quenching and cooling of each lobe, it is preferably rotated relative to the induction coil while being heated and the streams of liquid while being quenched and cooled. Usually, a heated lobe will be quenched and adequately cooled by an aqueous liquid spray applied for a period of time of about 1 to 5 seconds. Preferably, a sufficient quantity of quenching liquid is sprayed so that the lobe is flooded or engulfed in the quenching liquid.

HARDENING APPARATUS

A suitable apparatus 20 to carry out this induction heating and quenching of each lobe 22 of a camshaft 24 is shown in FIG. 1 of the drawings. When inserted in the apparatus, camshaft 24 is of soft steel and has been completely machined and the lobes 22 have been ground to the desired contour and finish of their cam surfaces 26. Each camshaft is encircled by an induction coil 28 when received in a carrier assembly 30 for generally axial movement or indexing with respect to the coil. The carrier assembly is reciprocated by a drive mechanism 32 mounted on a support 34 carried by a base 36. The carrier 30 is received in a quench shield and tank assembly 38 through which an aqueous quench liquid 40, such as water, is circulated by a pump 42 mounted on the base.

Each camshaft is received and supported on a pair of opposed live centers 44 and 46 carried by arms 48 and 50. Each upper live center 44 is yieldably biased toward its associated lower center and can be extended and retracted to engage and release a camshaft by actuating a pneumatic cylinder 52 with its piston rod operably connected to the upper live centers by conventional mechanism (not shown). To rotate the camshafts with respect to the coils, all of the centers are intermittently driven in unison by a drive assembly 54. The drive assembly has an electric or pneumatic motor 56 with its output shaft connected to a drive shaft 58 operably connected to the live centers by chains and sprockets (not shown).

The arms 48 and 50 of the carrier assembly are mounted on a slide 60 received for reciprocation on a pair of laterally spaced apart shafts 62. The ends of the shafts are secured to upper and lower plates 64 and 66 fixed to a pair of laterally spaced apart support columns 68. The slide and carrier assembly is indexed and reciprocated on the shafts by a ball and and screw drive assembly 70 having a reversible electric drive motor 72 mounted on the upper plate. A counterweight 74 is operably connected to the slide 60 by a chain 76 received on idler sprockets 78 journalled on stub shafts 80 carried by a mounting bracket 82 secured to the upper plate 64.

Movement of the carrier and slide to provide the desired indexing and sequence of intermittent movement of the camshaft relative to the induction coils is controlled by a programmable controller (not shown) which is programmed to start, run, stop and reverse the drive motor 72 to produce the desired movement and dwell of the camshafts relative to the coils. A suitable programmable controller is commercially available as Model No. 230 from Allen Bradley Company Systems Division of Cleveland, Ohio. A signal indicating the home or fully raised position of the carriage and slide is provided for the programmable controller by a limit switch 84 which is tripped by dog 86 carried by the slide. The home positions can be adjusted by changing the vertical location at which the limit switch is secured to the column 68.

The quench shield and tank assembly 38 is generally rectangular and has a bottom 88 fixed to the base and upstanding side walls 90 and end walls 92. The tank provides a reservoir for the aqueous quench liquid 40 through which it is circulated by the pump 42 which has its inlet connected to the tank by a pipe 94. The outlet of the pump is connected to spray heads associated with the coils through the pipe 96.

Each induction coil 28 is supported and connected to the power supply by rigid electric connectors 98, 100 and 102. Each connector is made of an electrically conductive metal, such as copper, and is in the form of a hollow tube so that a cooling fluid, such as water, can be circulated through it to prevent the conductors and induction coils from becoming overheated when in use. Cooling fluid enters an inlet head 104 of the conductor 98 and exits through an outlet head 106 connected by a flexible hose (not shown) to an inlet head 108 of the first coil 28 through which it exits from outlet head 110 connected by a flexible hose (not shown) to an inlet head 112 of the conductor 100 through which it exits from an outlet head 114 connected by a flexible hose (not shown) to an inlet head 116 of the second coil 28 through from which it exits through an outlet head 118 connected by another flexible hose to the inlet head 120 of the conductor 102 from which it exits through an outlet head 122.

The conductors and the legs 124 and 126 of the coils 28 are electrically insulated by strips of an insulating material 128 such as teflon, received therebetween and are secured together by nuts and bolts 130 made of an electrically insulating resin.

Figure 2:
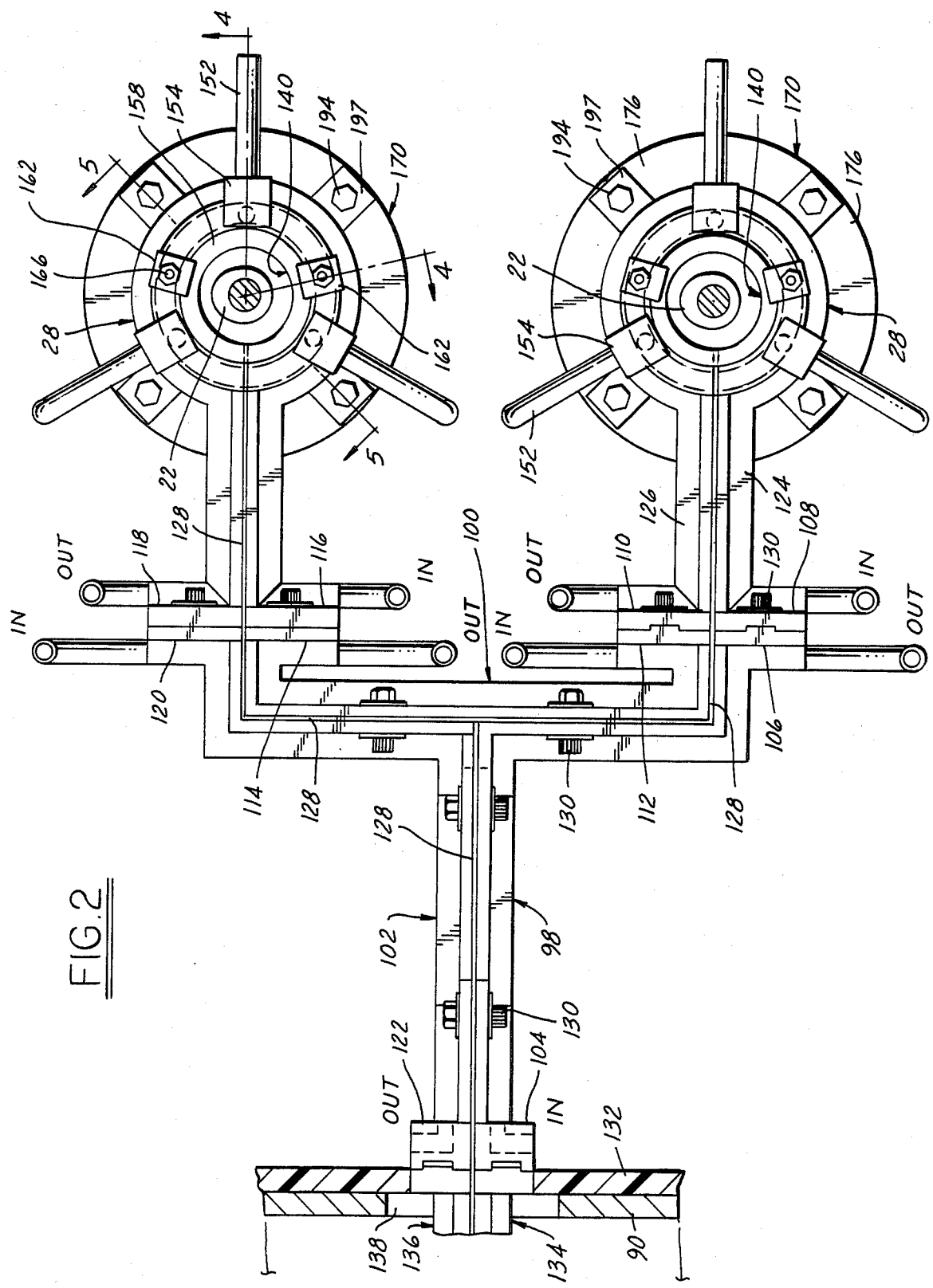
FIG. 2 is a sectional view taken on line 2—2 of FIG. 1 and illustrating induction coils of the apparatus of FIG. 1.
Figure 3:
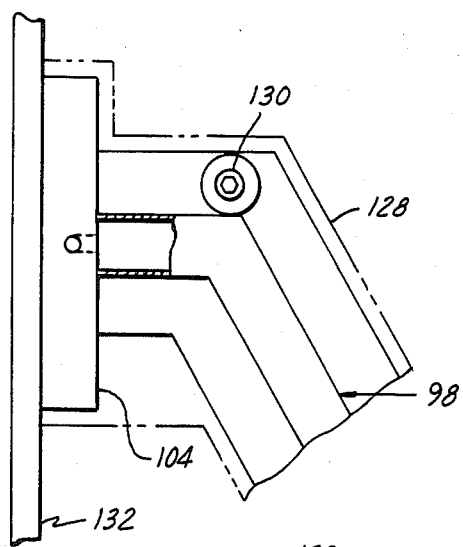
FIG. 3 is a fragmentary side view of the induction coil of FIG. 2—2.

The coils 28 are supported by the conductors 98 and 102 in fixed relation to the base by being mounted on a plate 132 of an electrically insulating material such as nylon. As shown in FIG. 2 the conductors 98 and 102 are releasably secured to conductors 134 and 136 connected to the power supply. The conductors 134 and 136 pass through a hole 138 in the sidewall 90 of the tank and are secured to the nylon mounting plate 132 which is secured and sealed to the sidwall of the tank.

Figure 4:
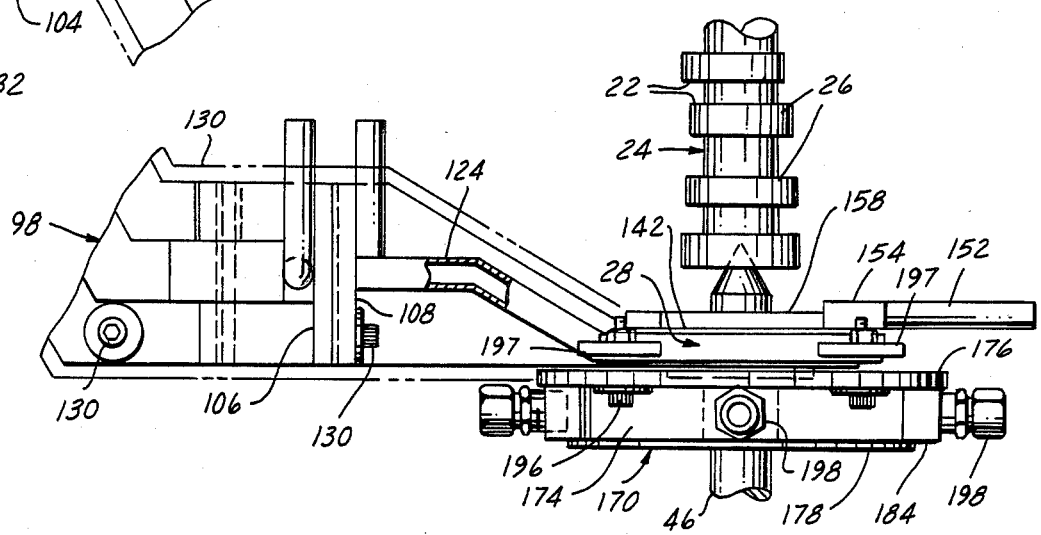
FIGS. 4 and 5 are sectional views taken generally on lines 4—4 and 5—5 respectively of FIG. 2.
Figure 4:
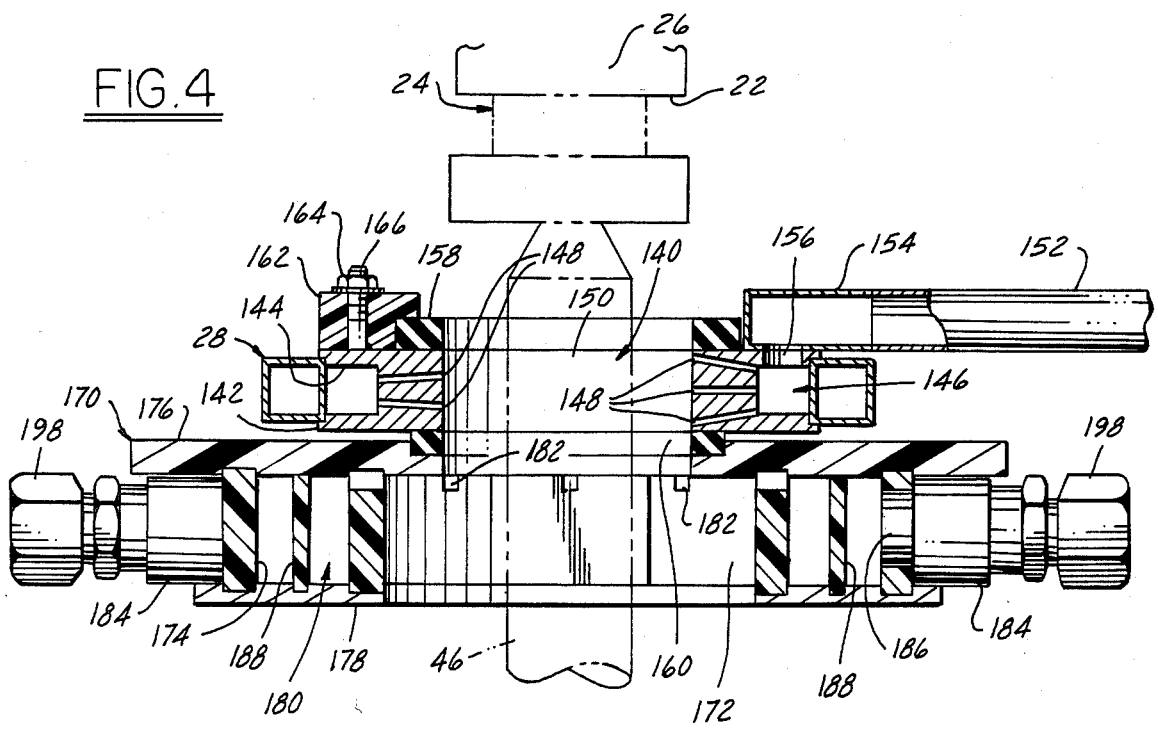

In accordance with one feature of this invention, as shown in FIGS. 2 and 4, preferably a spray head 140 is mounted within each induction coil to direct a stream of quenching liquid under pressure onto a lobe after it is heated. Preferably this spray head is made of an electrically conductive material, such as copper, and is electrically connected to and part of the induction coil. The spray head is in the form of a copper ring 142 with a groove 144 its outer face which in cooperation with the coil defines an annular passage 146 through which quenching liquid is supplied to a plurality of circumferentially spaced outlet passages or ports 148 opening into the inner face 150 of the ring to provide a plurality of nozzles for directing streams of quenching liquid onto a heated lobe. The ring is sealed and secured to the coil such as by brazing. The quenching liquid is supplied to the passage 146 through three circumferentially spaced conduits 155 each connected to an inlet 154 communicating with the pasage 146 through a port 156. Quenching liquid is supplied to the conduits 152 under pressure from the pump 48 through a conventional solenoid operated valve (not shown) which turns the flow of quenching liquid on and off as needed.

To minimize induction heating of portions of the camshaft adjacent the lobe, the induction coil and spray head assembly has a pair of shields in the form of rings 158 and 160 disposed on the opposed faces of the spray head. These rings can be a plurality of stacked laminated steel plates or preferably a solid ring of a ferric material. A suitable ferric material is sold under the trade name "FARRACOM" by Polymer Corporation, Reading, Pa. 19603. The upper ring 158 is retained on the spray head by circumferentially spaced clips 162 retained by nuts 164 received on studs 166 fixed to the ring.

In accordance with this invention, preferably quenching or cooling liquid is also sprayed on the camshaft immediately below the lobe received in the coil to prevent annealing any adjacent previously hardened lobe. Preferably this is accomplished by a cooling spray head 170 underlying and carried by the coil. Preferably, the spray head 170 is made of electrically non-conductive and insulating materials, such as nylon and PVC plastic resins.

The cooling spray head 170 has spaced apart inner and outer annular walls 172 and 174 received between top and bottom annular walls 176 and 178 which define an annular passage 180. Streams of cooling liquid are discharged from the passage and directed onto the camshaft by a plurality of circumferentially spaced nozzles or discharge ports 182 through the inner annular wall adjacent its upper edge. Cooling liquid is supplied to the passage 180 through four circumferentially spaced inlets 184 adhesively secured to the outer annular wall 172 and communicating with the passage through an aligned port 186. Liquid discharged from each inlet is deflected into the passage 180 by a baffle plate 188 disposed in the passage.

Figure 5:
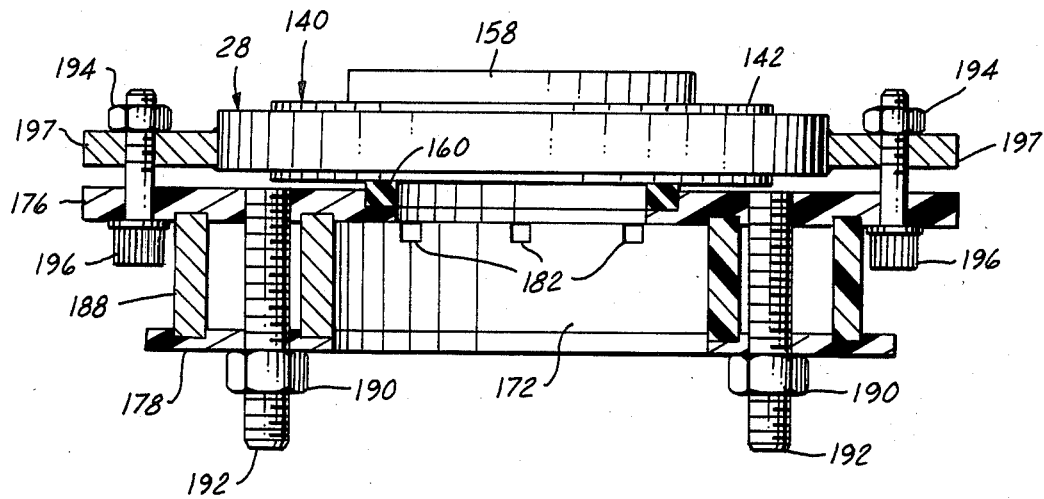

As shown in FIG. 5, the walls of the spray head are secured together in assembled relationship by nuts 190 received on circumferentially spaced studs 192 fixed to the upper wall. The nuts and studs are of an electrically insulating material such as Nylon. The cooling sprayhead is releasably mounted on the coil by nuts and bolts 196, preferably of Nylon, passing through the upper wall and tabs 197 braised to the induction coil. Cooling liquid is supplied to the spray head by flexible hoses (not shown) connected by fittings 198 to the inlet heads. Quenching liquid is supplied under pressure from the pump to these hoses through a conventional solenoid valve which turns on an off as needed the flow of cooling liquid to the spray head.

POWER SUPPLY

Figure 6:
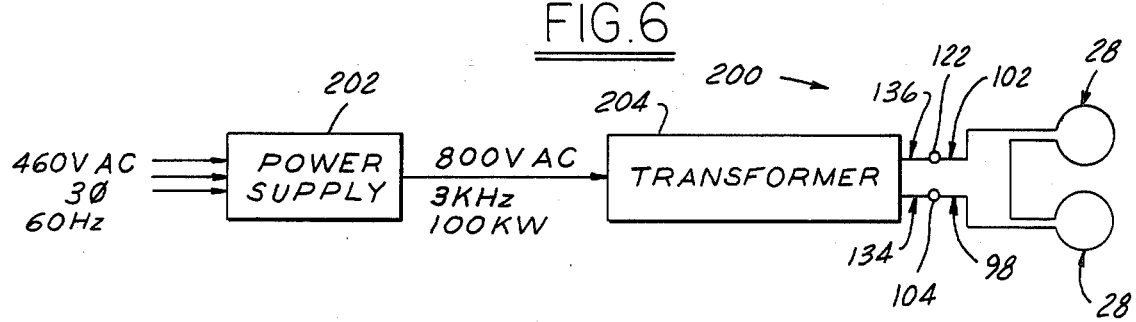
FIG. 6 is a block diagram of a power supply of the apparatus of FIG. 1.

A suitable power supply 200 for producing and supplying altenating current to the coils 28 of the apparatus 20 is shown in the block diagram of FIG. 6. Utility or plant electric power at 460 volts AC, 60 Hz and three phase is fed to a solid state power supply 202 which produces a single phase output alternating current at a frequency of 3 or 10 KHz at 800 volts AC and 100 KW. A suitable power supply 202 is commercially available from IPE Cheston of 32251 North Avis Drive, Madison Heights, Mich. 48071.

The output of the power supply 202 is fed to the primary winding of a single phase transformer 204. The secondary winding of the transformer 204 is connected to the coils 28 preferably in series although they could be connected in parallel. The turns ratio of the primary winding to the secondary winding of the transformer 204 is selected to match the load created by the induction coils and the cam lobes being heated by them. This turns ratio is usually in the range of about 15:1 to 5:1. For example, in one working embodiment, the turns ratio is 10:1 so that the output of the power supply of 800 volts AC, 3 KHz at 100 KW is stepped down by the transformer 204 to 80 Volts AC, 3 KHz at 100 KW which is applied to the induction coils 28 connected in series.

The induction heating and quenching apparatus also has a number of electric and electropneumatic circuits and components for cycling and operating the apparatus, which have not been described because they can be conventional and are unnecessary to a complete understanding of this invention.

SETUP AND USE

Apparatus 20 is setup for use by connecting it to a suitable source of compressed air and plant or utility electric power and placing a suitable quantity of aqueous quenching liquid 40 in the shield and tank assembly 38. Preferably, the tank is not filled with so much quenching liquid than the bottom arm 50 of the carrier assembly 30 will be submerged when it is lowered sufficiently to dispose the uppermost lobe of the camshaft 28 in the induction coil 28 (as shown in phantom in FIG. 1).

When using the apparatus 20 to carry out the method of this invention, the carrier assembly 30 is initially in the fully raised position shown in solid lines in FIG. 1, and the upper locator pins 44 are fully retracted by energizing the cylinder 52. A pair of camshafts 28 with lobes ready to be hardened are inserted between the locator pins 44, 46 and then the upper pins 44 are advanced by energizing the cylinder 52 to locate and releasably clamp the camshafts in the carrier. The cylinder 52 can be energized and controlled through conventional electropneumatic circuitry (not shown). To dispose the lowermost lobe 22 of each camshaft in its associated induction coil 28, the carrier assembly 30 and slide 60 are moved generally vertically downward by energizing the drive motor 72 to rotate the ball and screw assembly 70. The motor is started, stopped and the extent of rotation of the screw varied and controlled by the programmable controller (not shown) to properly index or advance one lobe at a time each camshaft into its associated induction coil and to provide the appropriate dwell for each lobe in the coil while it is induction heated by a current applied to the coil and then quenched.

To rotate the lobes of the camshafts while they are being induction heated and quenched, the motor 56 is energized through appropriate control circuitry (not shown) and preferably runs continuous while all of the lobes of each camshaft are indexed one at a time through an associated coil. However, if desired, the motor 56 can be started and stopped to intermittently rotate each lobe while it is being heated by the induction coil and quenched by one of the spray heads.

For each lobe of the camshaft disposed by the carrier assembly in an associated induction coil, the power supply is energized to apply an alternating current to the coil to heat by induction the lobe. The period of time during which alternating current produced by the power supply is applied to the coil can be varied and controlled by a conventional timer or appropriate electronic circuitry (not shown). After the current has been applied to the coil, the heated lobe is quenched by the quenching liquid 40 supplied to the spray head 140 under pressure by the pump 42. To adequately quench and harden the cam surface of each lobe, the quenching liquid is usually supplied to the spray head for about 3 seconds. Preferably, the quench liquid is also simultaneously supplied to the cooling spray head 170 to insure that any previously hardened lobe underlying the lobe in the coil is not annealed by the induction heating of the lobe in the coil. The supplying of the quenching liquid to the sprayheads can be controlled by conventional solenoid operated valves and electric or electronic circuitry (not shown). Preferably, the quenching liquid is supplied to the spray heads at a pressure of 20 to 40 PSI and a rate of 10 to 20 gallons per minute (GPM) for head 140 and 5 to 10 GPM for head 170.

After the uppermost lobe of each camshaft has been induction heated by the coils and quenched, the programmable controller reverses the drive motor 72 to rotate the ball and screw assembly 70 to raise and return the carrier 30 and the camshafts 24 to the fully raised or home position as shown in FIG. 1 whereupon the dog 86 trips the limit switch 84 to provide a signal to the programmable controller to deenergize and stop the drive motor. Thereafter, the camshafts are released from the carrier by energizing the cylinder 52 to raise the upper pins 44, and then removed from the apparatus.

Subsequently, another pair of camshafts with finished lobe ready to be hardened can be inserted between the locator pins 44, 46 and the upper pins 44 lowered to engage the clamp the camshafts in the carrier assembly by energizing the cylinder 52. The apparatus 20 is then ready to begin another cycle to harden the cam surfaces of the lobes of these camshafts.

Preferably, after all the lobes have been hardened and the camshafts are removed from the apparatus 20, the hardened cam surfaces can be cleaned to remove any oxidation produced by heating and quenching the lobes. The hardened lobes can be cleaned by blasting them in a pneumatic blasting machine with glass beads or micro balloons having a diameter of about 0.002 to 0.006 of an inch. Preferably, the journals of the camshafts are masked to prevent their surfaces from being degraded by the blasting operation. This blasting does not adversely affect the finish of the hardened cam surfaces of the lobes. If desired, every lobe of every camshaft can be inspected by conventional, and preferably automated, eddy current hardness testing machines.

We claim:

1. A method of finishing and hardening a lobe of a camshaft which lobe is of a metal which can be hardened by heating and quenching, the method comprising: providing the contour and finish of the cam surface on the lobe before it is hardened, disposing the lobe so that it is encircled by and spaced from an induction coil, disposing a spray head adjacent the lobe, applying to the coil for not more than five seconds an alternating current with a power of at least 30 killowatts per square inch of the cam surface of the lobe to rapidly heat the peripheral portion of the lobe to a temperature of at least about 1500° F. on the cam surface, and after the current has been applied to the coil, supplying an aqueous liquid to the spray head to quench the heated lobe to thereby harden the periphery of the lobe to a depth not greater than about 0.18 of an inch without any significant distortion or warpage of the cam surface of the lobe.

2. The method of claim 1 wherein the current applied to the coil has a frequency of at least about 3,000 Hz and a power in the range of about 35 to 60 killowatts per square inch of the area of the cam surface of the lobe.

3. The method of claim 1 wherein the current is applied to the coil for not more than three seconds and has a frequency of at least about 3,000 Hz and a power of at least about 40 killowatts per square inch of the area of the cam surface of the lobe.

4. The method of claim 1 wherein the period of time and power of the current applied to the coil are selected and the quench controlled so that the periphery of the lobe is hardened to an average depth not greater than about 0.12 of an inch.

5. The method of claim 1 which also comprises disposing a second spray head adjacent to and axially spaced from the lobe when disposed in the coil, the second spray head being constructed and arranged to discharge liquid onto the camshaft adjacent the lobe when received in the coil, and after the current has been applied to the coil supplying an aqueous liquid to the second spray head to cool an area of the camshaft adjacent the lobe to prevent and previously hardened immediately adjacent lobe of the camshaft from being annealed by the heating of the lobe disposed in the coil.

6. The method of claim 1 wherein aqueous liquid is supplied to the spray head to quench the heated lobe at least in part while such heated lobe is still disposed in the coil.

7. The method of claim 1 wherein the cam has multiple lobes axially spaced apart and the lobes are advanced sequentially one at a time into the coil and the current is applied to the coil once for a period of not more than five seconds for each lobe disposed in the coil and an aqueous liquid is intermittently supplied to the spray head to quench each lobe after it has been heated by the current applied to the coil and at least in part while such heated lobe is still disposed in the coil.

8. The method of claim 1 wherein the outlets of the spray head are encircled by the coil.

9. The method of claim 1 wherein the spray head is of an electrically conductive metal and is disposed in and an integral part of the coil.

10. The method of claim 1 which also comprises providing relative rotation between the lobe and coil at least while the current is applied to the coil to heat the lobe.

11. The method of claim 1 which also comprises providing relative rotation between the lobe and the coil at least while the current is applied to the coil to heat the lobe and between the lobe and the spray head at least while the liquid is supplied to the spray head to quench the heated lobe.

12. An apparatus for hardening a lobe of a metal which can be hardened by heating and quenching of a camshaft having the desired contour and finish of the cam surface on the lobe before the lobe is hardened, the apparatus comprising:
an induction coil of an electrically conductive metal constructed and arranged to encircle and be spaced from the lobe,
a power supply constructed and arranged to apply to the coil for not more than five seconds an alternating current with a power of at least 30 killowatts per square inch of the area of the cam surface of the lobe to rapidly heat the peripheral portion of the lobe to a temperature of at least about 1500° F. on the cam surface,
a spray head adjacent the coil and constructed and arranged to direct aqueous liquid onto the lobe when disposed within the coil,
and supply means constructed and arranged to intermittently supply an aqueous liquid to the spray head after the lobe has been heated by the coil to quench the heated lobe and thereby harden the periphery of the lobe to a depth not greater than about 0.18 of an inch without any significant distortion or warpage of the cam surface of the lobe.

13. The apparatus of claim 12 wherein the power supply is constructed and arranged to produce an alternating current with a frequency of at least about 3,000 Hz and a power in the range of about 35 to 60 killowatts per square inch of the cam surface of the lobe.

14. The apparatus of claim 12 wherein the power supply is constructed and arranged to apply the current to the coil and the liquid supply is constructed and arranged to supply aqueous liquid to the spray head so that the periphery of the lobe is hardened to an average depth not greater than about 0.12 of an inch.

15. The apparatus of claim 12 which also comprises a second spray head constructed and arranged to be disposed adjacent to and axially spaced from the lobe when received in the coil to discharge aqueous liquid onto the camshaft adjacent the lobe when received in the coil, and said supply means being constructed and arranged to supply an aqueous liquid to said second spray head after the current has been applied to the coil to prevent annealing of any previously hardened immediately adjacent lobe by the heating of the lobe received in said coil.

16. The apparatus of claim 12 wherein the nozzles of said first mentioned spray head are encircled by said coil.

17. The apparatus of claim 12 wherein said first mentioned spray head is of a conductive metal and an electrically conductive part of said coil.

18. The apparatus of claim 12 which also comprises a drive constructed and arranged to rotate the lobe relative to said coil at least while the current is applied to said coil.

19. The apparatus of claim 12 which also comprises a drive constructed and arranged to rotate the lobe relative to both said coil and said spray head at least while the current is applied to said coil and an aqueous liquid is supplied to said spray head.

20. The apparatus of claim 12 which is adapted to receive a camshaft having multiple lobes axially spaced apart and also comprises a drive constructed and arranged to advance the lobes of the camshaft sequentially one at a time into said coil, said power supply is constructed and arranged to apply the current to said coil once for a period of not more than five seconds for each lobe received in said coil and said supply means is constructed and arranged to intermittently supply an aqueous liquid to said spray head to quench each lobe after it has been heated by the current applied to the coil and at least in part while such heated lobe is still received in said coil.

21. The apparatus of claim 20 which also comprises a second drive constructed and arranged to rotate relative to said coil, each lobe received in said coil at least while the current is applied to said coil to heat such lobe.

22. The apparatus of claim 20 which also comprises a second drive constructed and arranged to rotate relative to said coil and spray head, each lobe received in said coil at least while the current is applied to said coil to heat such lobe and a quench liquid is supplied to said spray head to quench such heated lobe.

23. The apparatus of claim 20 which also comprises locators constructed and arranged to receive and locate the camshaft so that its longitudinal axis extends generally vertically.

24. The apparatus of claim 21 which also comprises locators constructed and arranged to receive and locate the camshaft so that its longitudinal axis extends generally vertically.

25. The method of claim 5 wherein the cam has multiple lobes axially spaced apart, the lobes are advanced sequentially one at a time into the coil, the current is applied to the coil once for a period of not more than five seconds for each lobe disposed in the coil, the camshaft is disposed so that its axis extends generally vertically while each lobe is heated and quenched, and an aqueous liquid is intermittently supplied to the spray head to quench each lobe after it has been heated by the current applied to the coil and at least in part while such heated lobe is still disposed in the coil.

26. The method of claim 25 which also comprises providing relative rotation between each lobe and the coil, at least while the lobe in the coil is heated by current applied to the coil.

27. The method of claim 7 wherein the camshaft is disposed so that its axis extends generally vertically while each lobe is heated and quenched.

* * * * *